(12) United States Patent
Chen

(10) Patent No.: US 8,573,772 B2
(45) Date of Patent: Nov. 5, 2013

(54) EYEGLASSES

(76) Inventor: Yung-An Chen, Taipei (TW)

( * ) Notice: Subject to any disclaimer, the term of this patent is extended or adjusted under 35 U.S.C. 154(b) by 0 days.

(21) Appl. No.: 13/300,513

(22) Filed: Nov. 18, 2011

(65) Prior Publication Data
US 2013/0128220 A1    May 23, 2013

(51) Int. Cl.
*G02C 5/14*    (2006.01)

(52) U.S. Cl.
USPC .......................................................... 351/121

(58) Field of Classification Search
USPC ................................ 351/78–81, 88, 136–139
See application file for complete search history.

(56) References Cited

U.S. PATENT DOCUMENTS 5,418,581 A * 5/1995 Conway .......................... 351/116
5,898,471 A * 4/1999 Simioni et al. ................. 351/153

* cited by examiner

*Primary Examiner* — Scott J Sugarman
*Assistant Examiner* — Vipin Patel

(74) *Attorney, Agent, or Firm* — Li&Cai Intellectual Property (USA) Office

(57) ABSTRACT

The instant disclosure relates to a pair of eyeglasses, which includes an eyeglass frame and two temple arms pivotally connected thereto. Two shoulder portions are arranged on opposite ends of the eyeglass frame. Each one of the shoulder portions has an upper wall, a lower wall, and a shaft member. A receiving space is defined for each one of the shoulder portions. An inner flap is extended from the eyeglass frame toward the receiving space for each one of the shoulder portions. Each one of the temple arms has an anchoring section and an ear-resting section. Each one of the anchoring section has an engaging portion and an abutting portion. Each one of the temple arms can be at a closed position or an open position. At the open position, each one of the abutting portions is abutted to the corresponding flap.

9 Claims, 7 Drawing Sheets

EYEGLASSES

BACKGROUND OF THE INVENTION

1. Field of the Invention

The instant disclosure relates to a pair of eyeglasses; more particularly, to a pair of eyeglasses having detachable temple arms.

2. Description of Related Art

Of the traditionally recognized five senses, the sense of sight (or vision) plays an important role in the daily life. However, due to aging or occupational overuse of the eyes, one's eyesight will regress progressively and causes inconveniences in daily routines. The need for vision correction gives rise to eyeglasses. Capable of bearing different lenses, the eyeglasses can be classified into different types, such as optical glasses, sunglasses, sports glasses, goggles, ski glasses, safety glasses, glasses for aesthetic or fashion purposes, etc. Classifying by material, the eyeglasses may have glass lenses, plastic lenses, acrylic lenses, etc. By having a broad range of applications, eyeglasses have become an indispensable commodity in today's society.

A modern pair of eyeglasses typically comprises a frame bearing a pair of lenses. Fasteners such as screws are used to hinge the temple arms on the eyeglass frame. However, after repeated use, the screws can become loose or worn, causing the temples arms to detach from the frame. In other words, the eyeglasses user must use an accessory tool to tighten or remove the bad screws. This conventional procedure takes time and considerable effort must be spent.

To address the above issues, the inventor strives via industrial experience and academic research to present the instant disclosure, which can effectively improve the limitations described above.

SUMMARY OF THE INVENTION

The instant disclosure provides a pair of eyeglasses, which includes an eyeglass frame and two temple arms. Two shoulder portions are arranged on opposite sides of the eyeglass frame. Each shoulder portion has an upper wall, a lower wall, and a shaft member. A receiving slot is defined by the eyeglass frame, the upper wall, and the lower wall. An inner flap extends from the eyeglass frame toward the receiving slot. Each temple arm has an anchoring section and an ear-resting section. The anchoring section has an engaging portion and an abutting portion. The abutting portion extends from the engaging portion away from the ear-resting section. Whereas the engaging portion is hinged to the shaft member. Each of the temple arms can pivotally occupy a substantially closed position that is substantially parallel with respect to the eyeglass frame or occupy a substantially open position that is substantially perpendicular with respect to the eyeglass frame. While at the open position, the abutting portion of each temple arm abuts to the corresponding inner flap.

The instant disclosure provides another pair of eyeglasses, which includes a lens and two temple arms. Two shoulder portions are arranged on opposite corner (side) portions of the lens. Each of the shoulder portions comprises an upper wall, a lower wall, and a shaft member. A receiving slot is defined by the lens, the upper wall, and the lower wall. An inner flap extends from the lens toward the receiving slot. Each one of the temple arms has an anchoring section and an ear-resting section. The anchoring section has an engaging portion and an abutting portion. The abutting portion extends from the engaging portion away from the ear-resting section. Whereas the engaging portion is hinged to the shaft member. Each of the temple arms can pivotally occupy a substantially closed position that is substantially parallel with respect to the eyeglass frame or occupy a substantially open position that is substantially perpendicular with respect to the eyeglass frame. While at the open position, the abutting portion of each temple arm abuts to the corresponding inner flap.

Based on the above, the instant disclosure has the following advantages. The shoulder portions of the eyeglass frame and the engaging portions of the temple arms allow each temple arm to decouple from the eyeglass frame with ease, thereby saving time and effort. The shoulder portions and the inner flaps of the eyeglass frame, along with the engaging portions and abutting portions of the temple arms, can prevent the temple arms from slipping off the eyeglass frame/lens effectively. The temple arms are also confined to pivot within a pre-determined range to provide secure coupling with the eyeglass frame/lens.

In order to further appreciate the characteristics and technical contents of the instant disclosure, references are hereunder made to the detailed descriptions and appended drawings in connection with the instant disclosure. However, the appended drawings are merely shown for exemplary purposes, rather than being used to restrict the scope of the instant disclosure.

DETAILED DESCRIPTION OF PREFERRED EMBODIMENTS

Figure 1:
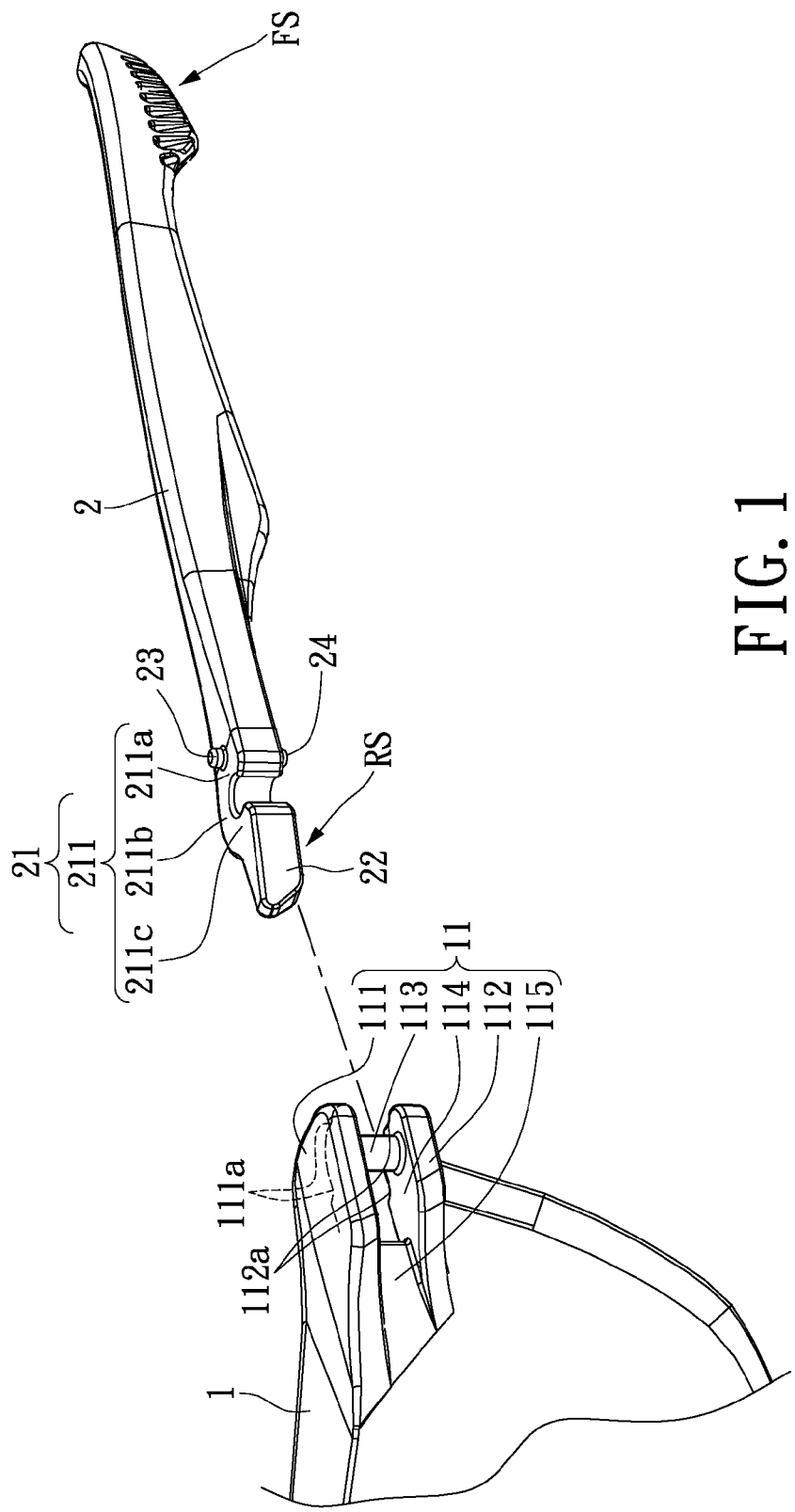
FIG. 1 is an exploded view for a portion of a pair of eyeglasses for the instant disclosure.
Figure 2:
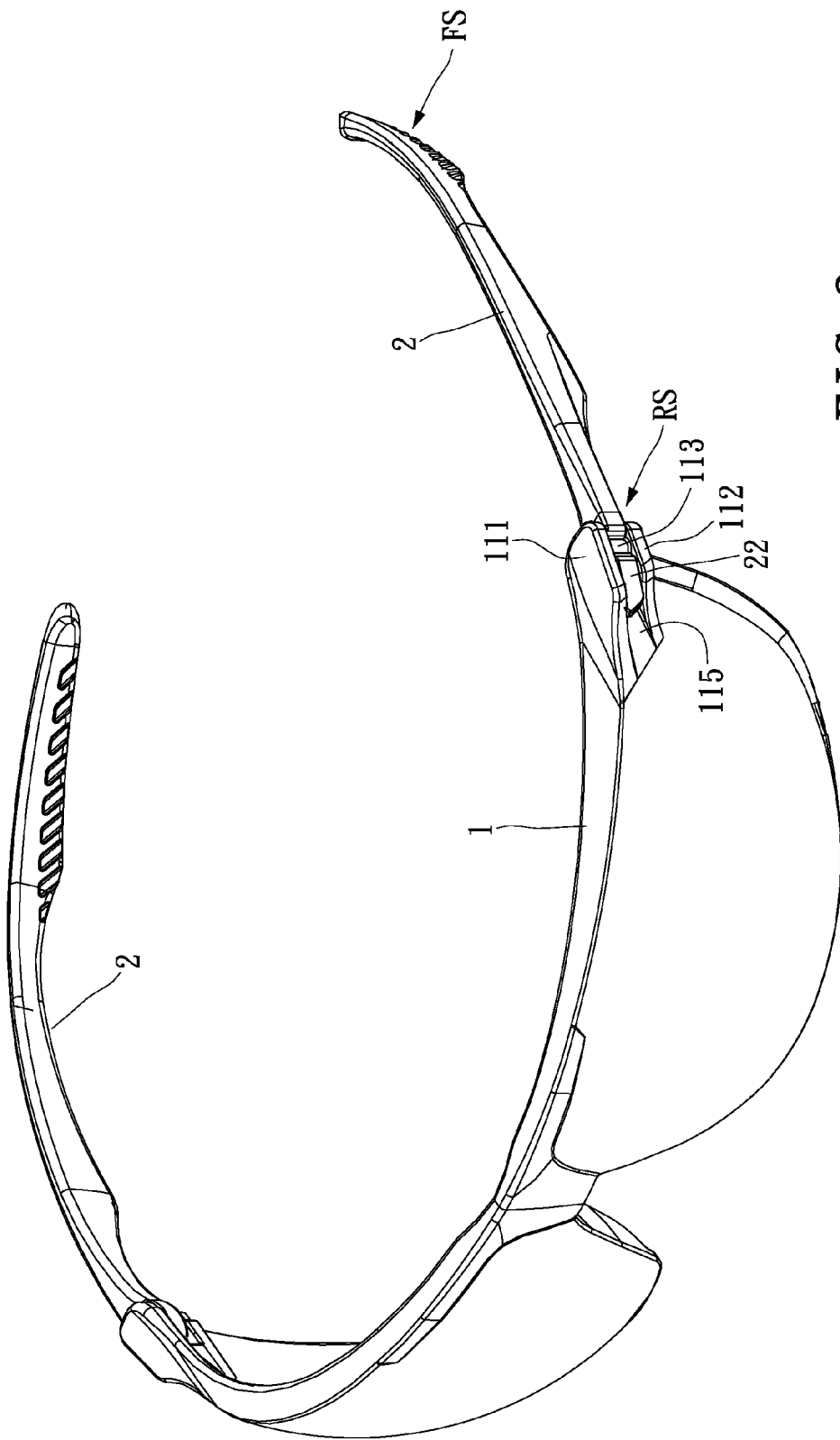
FIG. 2 is an assembled view for the eyeglasses of the instant disclosure.

Please refer to FIGS. 1 and 2. FIG. 2 shows a pair of eyeglasses of the instant disclosure, while FIG. 1 shows an enlarged view of the shoulder portion and one of the temple arms of the eyeglasses. The eyeglasses of the instant disclosure comprise an eyeglass frame 1 housing a pair of temple arms 2 that can be pivotally connected thereto. A pair of shoulder portions 11 is arranged oppositely on the eyeglass frame 1. Each one of the temple arm 2 has an anchoring section RS and an ear-resting section FS. The anchoring section RS has an engaging portion 21 and an abutting portion 22. The engaging portion 21 of the temple arm 2 can be easily decoupled from the shoulder portion 11 of the eyeglass frame 1. Thus, a significant amount of time and effort can be saved to assemble or disassemble the eyeglasses.

Figure 3:
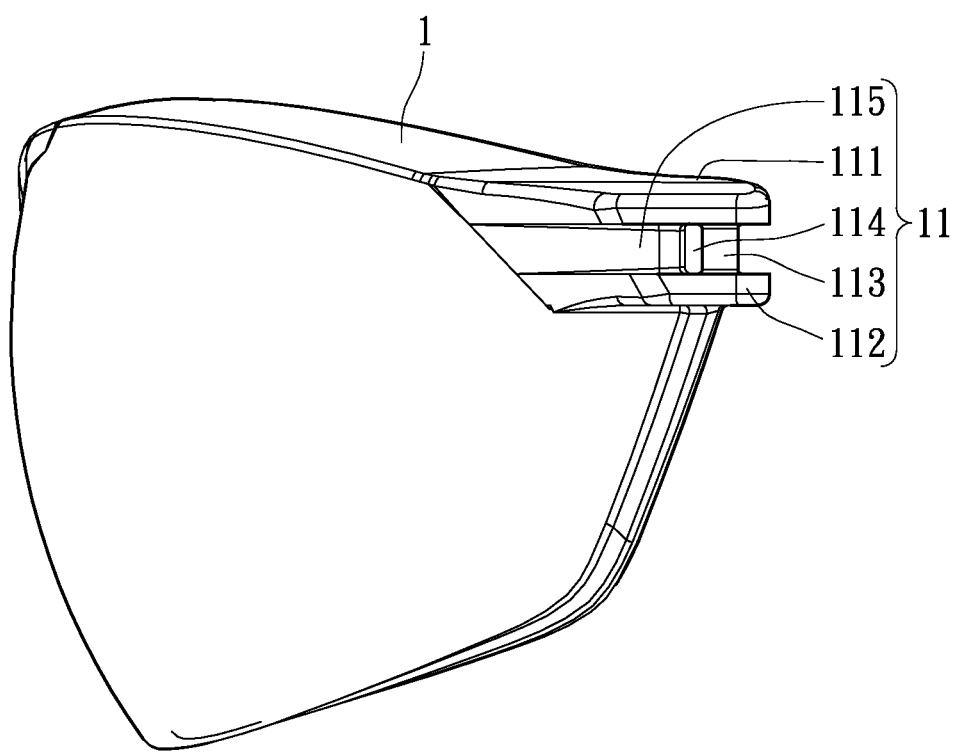
FIG. 3 is a side view of an eyeglass frame for the eyeglasses of the instant disclosure.

More detailed elaborations are given hereinbelow regarding the instant embodiment. Please also refer to FIG. 3 in conjunction with FIGS. 1 and 2. FIG. 1 is a detailed view of the shoulder portion 11 and the temple arm 2 for the eyeglasses of the instant disclosure. FIG. 2 is an assembled view of the eyeglasses, while FIG. 3 is a side view of the eyeglass frame 1. As illustrated in FIGS. 1 and 3, each of the shoulder portions 11 for the eyeglasses of the instant disclosure has an upper wall 111, a lower wall 112, and a shaft member 113. For the instant embodiment, the eyeglass frame 1 is preferably formed with the shoulder portions 11 in one piece. In other words, the upper wall 111, the lower wall 112, and the shaft member 113 can be individually formed from the eyeglass frame 1. The shaft member 113 is connected between the upper wall 111 and the lower wall 112. A receiving space 114 is defined between the upper wall 111 and the lower wall 112. An inner flap 115 is extended from the eyeglass frame 1 toward the receiving space 114. The abovementioned eyeglasses of the instant disclosure can further include at least one lens (not labeled) mounted on the eyeglass frame 1.

As shown in FIG. 1, a Ω-shaped indent 211 is formed on the engaging portion 21 of each temple arm 2. The indent 211 is for clipping to the shaft member 113 (preferably column-shaped). The abutting portion 22 extends from the edge of the indent 211 of the engaging portion 21 away from the ear-resting section FS. For the instant embodiment, each one of the temple arms 2 can be formed in one piece. In other words, the engaging portion 21 and the abutting portion 22 are formed in one piece. In particular, the engaging portion 21 has a first curved portion 211a, a second curved portion 211b, and a third curved portion 211c. The first curved portion 211a is arranged near the ear-resting section FS of each one of the temple arms 2. The third curved portion 211c is extended in forming the abutting portion 22. Whereas the second curved portion 211b is arranged between the first curved portion 211a and the third curved portion 211c. The indent 211 is shaped, as a whole, by the first curved portion 211a, the second curved portion 211b, and the third curved portion 211c.

Please note, as shown in FIG. 1, at least two upper grooves 111a are formed on the upper wall 111. At least one upper protrusion 23 is formed on each one of the temple arms 2. The upper protrusion 23 may be slidably arranged in either upper groove 111a. At least two lower grooves 112a are formed on the lower wall 112. At least one lower protrusion 24 is formed on each one of the temple arms 2. Likewise, the lower protrusion 24 may be slidably arranged in either lower groove 112a. For the instant embodiment, two upper grooves 111a are formed on the upper wall 111, and at least two lower grooves 112a are formed on the lower wall 112. For each one of the temple arms 2, the upper protrusion 23 and the lower protrusion 24 are arranged on opposite surfaces thereof. The upper protrusion 23 can be slidably arranged in either upper groove 111a, while the lower protrusion 24 can be slidably arranged in either lower groove 112a. When each one of the temple arms 2 pivots about the eyeglass frame 1, the upper grooves 111a and the lower grooves 112a allow the corresponding temple arm 2 to fix at a specific orientation.

Figure 4A:
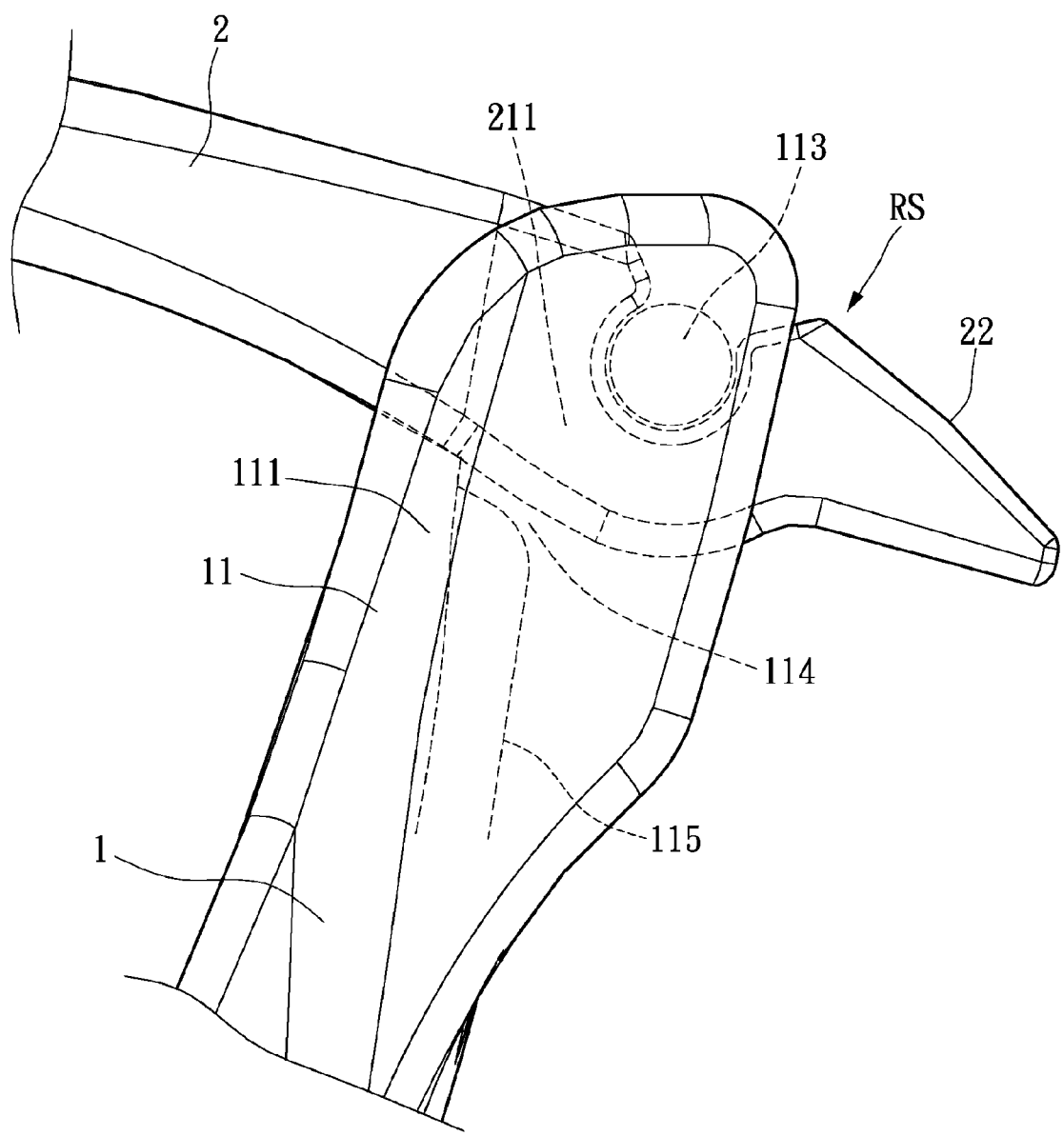
FIG. 4A is a top view of a temple arm oriented at the closed position for the eyeglasses of the instant disclosure.
Figure 4B:
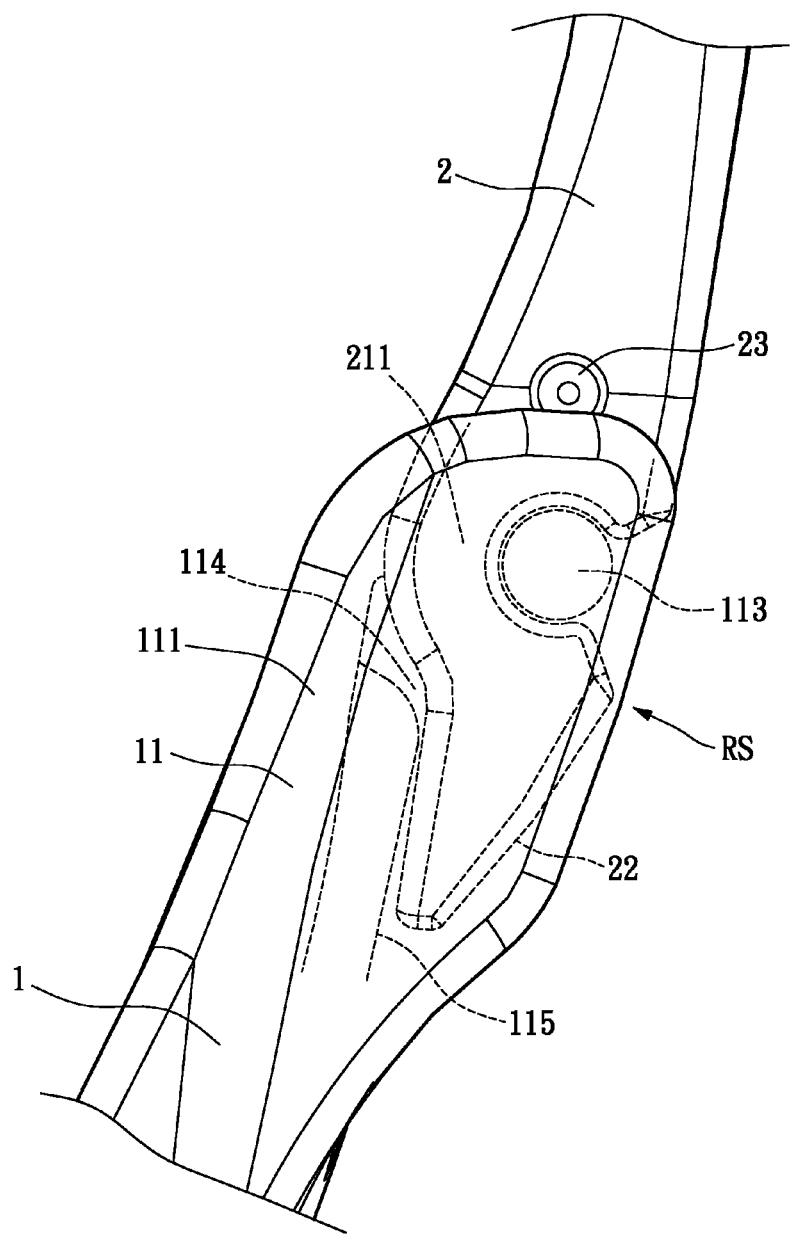
FIG. 4B is a top view of the temple arm oriented at the open position for the eyeglasses of the instant disclosure.

As shown in FIG. 2, the indent 211 for each one of the temple arms 2 can be pivotally connected to the corresponding shaft member 113. In other words, each one of the temple arms 2 can pivot with respect to the eyeglass frame 1 between a closed position (as shown in FIG. 4A) and an open position (as shown in FIG. 4B). Notably, as shown in FIG. 3, the distance between the shaft member 113 and the inner flap 115 is not restricted, as long as the indent 211 for each one of the temple arms 2 can pivot about the corresponding shaft member 113 smoothly.

As described above, the eyeglasses of the instant disclosure utilizes the upper wall 111, the lower wall 112, the shaft member 113, and the inner flap 115 for each one of the shoulder portions 11 to work cooperatively with the indent 21 and the abutting portion 22 of the corresponding temple arm 2. Thus, the temple arms 2 can be effectively prevented from slipping off the eyeglass frame 1. In addition, the pivoting angle for each one of the temple arms 2 can be controlled to fix the temple arm 2 at specific orientation. Moreover, the receiving space 114 defined for each one of the shoulder portions 11 allows the corresponding temple arm 2 to be easily coupled to the eyeglass frame 1. Specifically, the receiving space 114 for each one of the shoulder portions 11 allows the indent 211 of the corresponding temple arm 2 to be pivotally connected with the shaft member 113. In other words, each one of the temple arms 2 can be changed out from the eyeglass frame 1 easily if needed. Detailed descriptions are given hereinafter regarding the actual use of the eyeglasses of the instant disclosure.

Please refer to FIGS. 1, 4A, and 4B. FIG. 4A is a top view of the temple arm arranged at the closed position for the eyeglasses of the instant disclosure. Whereas FIG. 4B is a top view of the temple arm arranged at the open position. As shown in FIGS. 1 and 4A, when coupling the temple arms 2 to the eyeglass frame 1, the anchoring section RS for each one of the temple arms 2 can be oriented at a 90 degree angle with respect to the shoulder portion 11 upon being received by the receiving space 114. Then, the Ω-shaped indent 211 is pivotally connected to the corresponding shaft member 113 of the eyeglass frame 1. As shown in FIG. 4B, to wear the eyeglasses of the instant disclosure, each one of the temple arms 2 can be pivoted outward about the corresponding shoulder portion 11, allowing the flap 115 to be partially abutted by the abutting portion 22 of the corresponding temple arm 2. The inner flap 115 restricts further pivoting by the temple arm 2, such that each one of the temple arms 2 can stay securely next to the user's head (not shown). For the eyeglasses 2 of the instant disclosure, the receiving spaces 114 of the eyeglass frame 1 allow the respective temple arms 2 to be easily received therein. Through the engagement between the indent 211 for each one of the temple arms 2 and the corresponding shaft 113, each one of the temple arms 2 can be easily replaced by the user.

Please note, when the temple arms 2 are pivoting between the closed position (FIG. 4A) and the open position (FIG. 4B) about the respective shafts 113, the upper wall 111 and the lower wall 112 (FIG. 2) of each shoulder portion 11 allow the indent 211 of the corresponding temple arm 2 not to be exposed from the eyeglass frame 1. In other words, each one of the indent 211 can be protected by the corresponding upper wall 111 and the lower wall 112 (FIG. 2) to be less easily damaged. Moreover, the eyeglasses of the instant disclosure utilizes the shaft members 113 of the shoulder portions 11 and the indents 211 of the engaging portions 21 for fixing the temple arms 2 detachably to the eyeglass frame 1. Such assembling technique is easy to perform. In addition, by engaging the indent 211 of the engaging portion 21 to the corresponding shaft member 113 of the shoulder portion 11, each one of the temple arms 2 can be prevented from slipping off the eyeglass frame 1 while being firmly secured thereto.

Figure 5A:
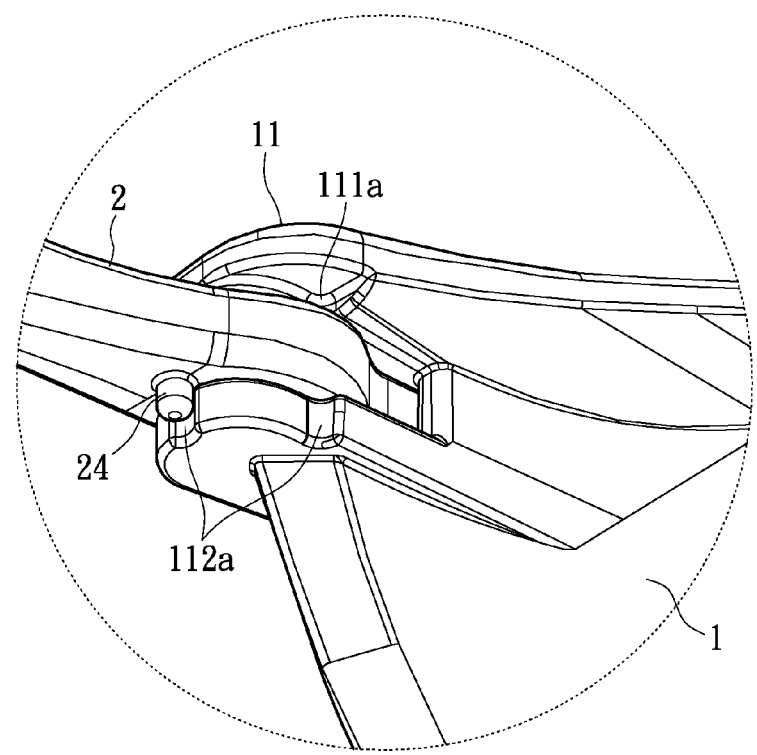
FIG. 5A is an enlarged view of the temple arm at the open position for the eyeglasses of the instant disclosure.
Figure 5B:
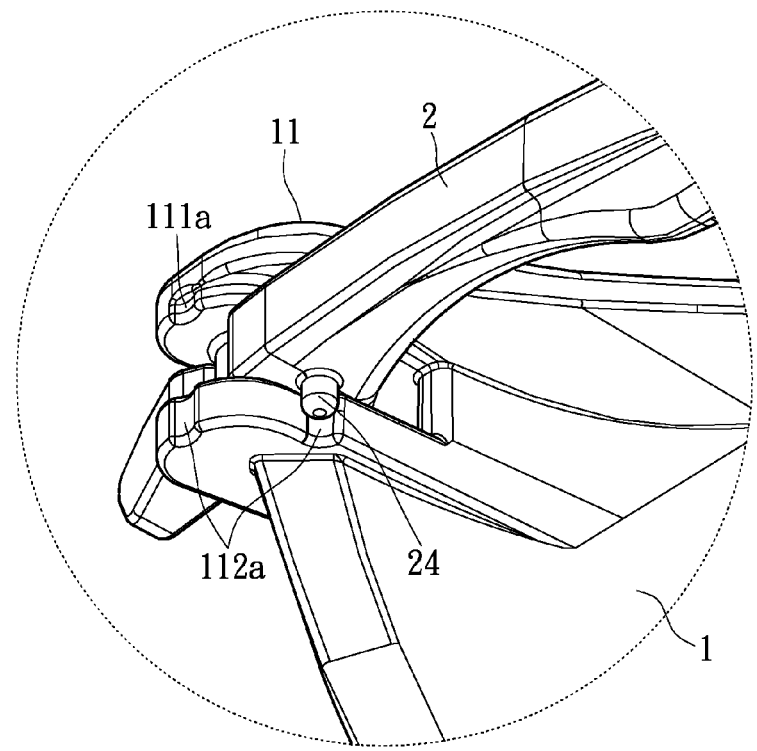
FIG. 5B is an enlarged view of the temple arm at the closed position for the eyeglasses of the instant disclosure.

Please refer to FIGS. 5A and 5B. FIG. 5A is an enlarged view of one of the temple arms of the eyeglasses of the instant disclosure at the open position. Whereas FIG. 5B is an enlarged view of the temple arm in FIG. 5A at the closed position. The upper protrusion 23 for each one of the temple arms 2 can be slidably arranged between the two upper grooves 111a. The lower protrusion 24 for each one of the temple arms 2 can be slidably arranged between the two lower grooves 112a. In addition, the upper protrusion 23 and the lower protrusion 24 are symmetrically arranged on each one of the temple arms 2. Thus, when each one of the temple arms 2 pivots between the open position (FIG. 5A) and the closed position (FIG. 5B), rotational friction is minimal and the applied pivoting force can be evenly distributed. Each one of the temple arms 2 can be pivoted in a multi-position-liked manner.

Figure 6:
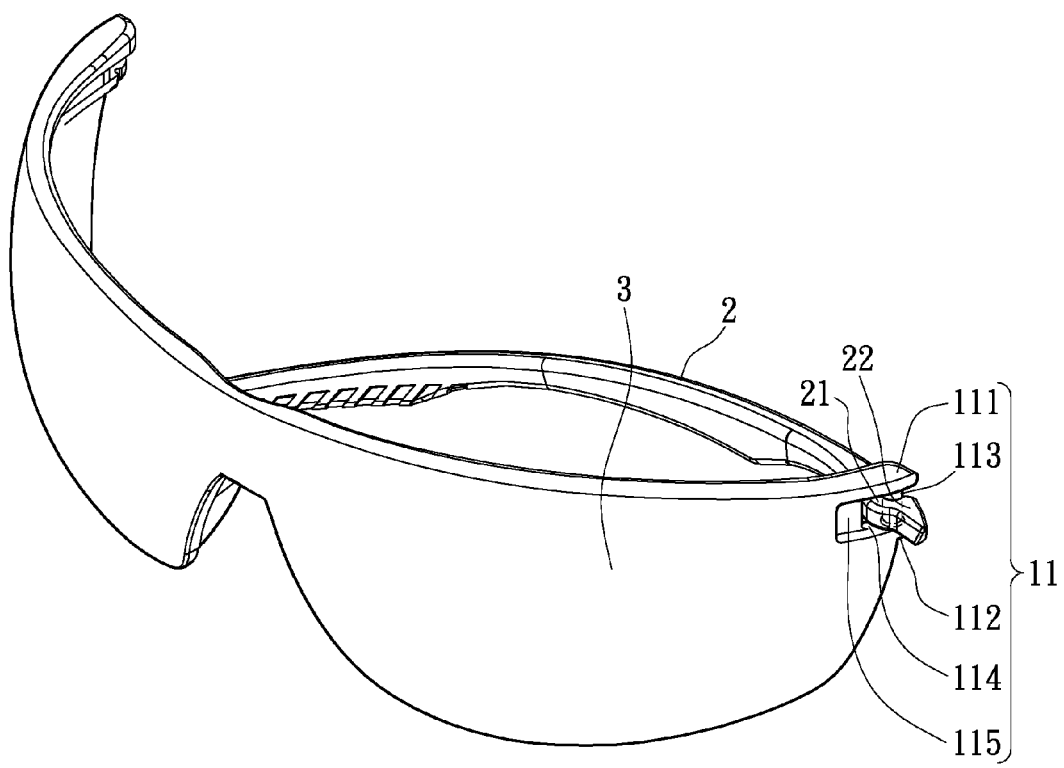
FIG. 6 is an assembled view of the eyeglasses for another embodiment of the instant disclosure.

Please refer to FIG. 6, which shows an assembled view of the eyeglasses for another embodiment of the instant disclosure. The instant embodiment differs from the previous embodiment by: having a lens 3 and two temple arms 2. Two shoulder portions 11 are arranged on opposite sides of the lens 3. The temple arms 2 are coupled to the shoulder portions 11 in a similar fashion as the previous embodiment, thus will not be discussed herein again. Notably, for the instant embodiment, the temple arms 2 are pivotally connected to the respective shoulder portions 11 of the lens 3.

Based on the above, the eyeglasses of the instant disclosure has the following advantages. The engaging portions are utilized to allow the temple arms to be pivotally connected to the shoulder portions of the eyeglass frame/lens. The temple arms can be easily detached to save time and effort. By using the shoulder portions and the inner flaps to work cooperatively with the engaging portions and abutting portions of the temple arms, the temple arms can be prevented effectively from slipping off the eyeglass frame/lens. The pivoting angle for each one of the temple arms can be restricted for anchoring the temple arm firmly. The receiving spaces for the eyeglass frame allow the respective temple arms to be easily received therein. By allowing the indent for each one of the temple arms to pivotally connect to the corresponding shaft member, each temple arm can be easily detached. By allowing the shaft member (preferably column-shaped) for each one of the shoulder portions to be pivotally engaged to the indent (preferably Ω-shaped) of the corresponding engaging portion, the coupling complexity between the temple arms and the eyeglass frame/lens is reduced. The engagement between the indent of the engaging portion and the shaft of the shoulder portion can prevent the corresponding temple arm from slipping off the eyeglass frame/lens and provide more secured coupling there-between. By arranging the upper protrusion and the lower protrusion on opposite surfaces on each temple arm and be slidably disposed between the two upper grooves and the two lower grooves, respectively, the rotational friction is minimal and the applied pivoting force can be evenly distributed. Each of the temple arms can be pivoted in a multi-position-liked manner.

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. A pair of eyeglasses, comprising:
   an eyeglass frame having two shoulder portions oppositely arranged thereon,
      each one of the shoulder portions having an upper wall, a lower wall, and a shaft member,
      each one of the shaft members being arranged between the corresponding upper wall and the corresponding lower wall,
      a receiving space being defined by the eyeglass frame, the upper wall, and the lower wall of each one of the shoulder portions,
      an inner flap being extended from the eyeglass frame toward the receiving space of each one of the shoulder portions;
   wherein each one of the upper walls has at least two upper grooves formed thereon, and each one of the lower walls has at least two lower grooves formed thereon; and
   a pair of temple arms, each having an anchoring section and an ear-resting section, wherein each of the anchoring section has an engaging portion and an abutting portion, wherein each of the abutting portions extends in a direction away from the corresponding ear-resting section, wherein each of the engaging portions is pivotally connected to the corresponding shaft members, wherein each one of the temple arms is capable of pivoting between a closed position and an open position, and wherein each one of the inner flaps is abutted by the corresponding abutting portion while at the open position;
   wherein each one of the temple arms further includes an upper protrusion and a lower protrusion arranged on the top and bottom surfaces thereof, and respectively, each one of the upper protrusions is capable of being slidably arranged in the corresponding upper grooves, and each one of the lower protrusions is capable of being slidably arranged in the corresponding lower grooves.

2. The pair of eyeglasses of claim 1, wherein the eyeglass frame and the shoulder portions are formed in one-piece.

3. The pair of eyeglasses of claim 1, wherein a Ω-shaped indent is formed on each one of the engaging portions for connecting pivotally to the corresponding shaft member.

4. The pair of eyeglasses of claim 3, wherein each one of the engaging portions is shaped by a first curved portion, a second curved portion, and a third curved portion, each one of the first curved portions being in proximity to the corresponding ear-resting section, each one of the third curved portions being extended in forming the corresponding abutting portion, each one of the second curved portions being arranged between the corresponding first curved portion and the corresponding third curved portion.

5. The pair of eyeglasses of claim 1, further comprising at least a lens mounted on the eyeglass frame.

6. A pair of eyeglasses, comprising:
   a lens having a pair of shoulder portions oppositely arranged thereon,
      each one of the shoulder portions having an upper wall, a lower wall, and a shaft member,
      each one of the shaft members being arranged between the corresponding upper wall and the corresponding lower wall,
      a receiving space being defined by the lens, the upper wall, and the lower wall of each one of the shoulder portions,
      an inner flap being extended from the lens toward the receiving space of each one of the shoulder portions;
   wherein each one of the upper walls has at least two upper grooves formed thereon, and each one of the lower walls has at least two lower grooves formed thereon; and
   a pair of temple arms, each one of the temple arms having an anchoring section and an ear-resting section, each one of the anchoring section having an engaging portion and an abutting portion, each one of the abutting portions extending in a direction away from the corresponding ear-resting section, each one of the engaging portions being pivotally connected to the corresponding shaft members, each one of the temple arms being capable of pivoting between a closed position and an open position, each one of the inner flaps being abutted by the corresponding abutting portion while at the open position;

wherein each one of the temple arms further includes an upper protrusion and a lower protrusion arranged on the top and bottom surfaces thereof, and respectively, each one of the upper protrusions is capable of being slidably arranged in the corresponding upper grooves, and each one of the lower protrusions is capable of being slidably arranged in the corresponding lower grooves.

7. The pair of eyeglasses of claim 6, wherein the lens and the shoulder portions are formed in one-piece.

8. The pair of eyeglasses of claim 6, wherein a Ω-shaped indent is formed on each one of the engaging portions for connecting pivotally to the corresponding shaft member.

9. The pair of eyeglasses of claim 8, wherein each one of the engaging portions is shaped by a first curved portion, a second curved portion, and a third curved portion, each one of the first curved portions being in proximity to the corresponding ear-resting section, each one of the third curved portions being extended in forming the corresponding abutting portion, each one of the second curved portions being arranged between the corresponding first curved portion and the corresponding third curved portion.

* * * * *